United States Patent [19]

Jones

[11] Patent Number: 4,873,206
[45] Date of Patent: Oct. 10, 1989

[54] DARK, NEUTRAL, GRAY, NICKEL-FREE GLASS COMPOSITION

[75] Inventor: James V. Jones, Cumberland, Md.

[73] Assignee: PPG Industries, Inc., Pittsburgh, Pa.

[21] Appl. No.: 215,191

[22] Filed: Jul. 5, 1988

[51] Int. Cl.$^4$ ............................................. C03C 3/087
[52] U.S. Cl. ..................................... 501/71; 296/211
[58] Field of Search ......................... 501/71; 296/211

[56] References Cited

U.S. PATENT DOCUMENTS

| Re. 25,312 | 1/1963 | Duncan et al. | 501/71 |
| 2,524,719 | 10/1950 | Tillyer | 501/71 |
| 2,892,726 | 6/1959 | Smith et al. | 501/69 |
| 3,296,004 | 1/1967 | Duncan | 501/71 |
| 3,300,323 | 1/1967 | Plumat et al. | 501/71 |
| 3,723,142 | 3/1973 | Kato et al. | 501/71 |
| 4,104,076 | 8/1978 | Pons | 501/71 |

FOREIGN PATENT DOCUMENTS 1331492  9/1973  United Kingdom ................. 501/71

*Primary Examiner*—Mark L. Bell
*Attorney, Agent, or Firm*—Dennis G. Millman

[57] ABSTRACT

A neutral, dark gray, nickel-free, soda-lime-silica glass having luminous transmittance less than 20 percent is produced with colorants consisting essentially of 0.55 to 1.0 percent by weight total iron (at least 15 percent in the ferrous state), 0.005 to 0.02 percent CoO, and 0.003 to 0.02 percent Se. The flat glass product having such a composition is particularly suitable for use in sun roofs.

12 Claims, No Drawings

DARK, NEUTRAL, GRAY, NICKEL-FREE GLASS COMPOSITION

BACKGROUND OF THE INVENTION

This invention involves a dark, neutral gray colored glass that has low luminous transmittance and low total solar energy transmittance. Although not limited to a particular use, the glass of this invention exhibits a combination of properties that make it highly desirable for use in sun roofs, particularly vehicle sun roofs. These properties include low visible light transmittance to reduce glare, low total solar energy transmittance to reduce heat gain in the interior of the enclosure, a neutral gray color for the sake of coordinating with a wide range of interior and exterior finish colors, and a composition compatible with flat glass manufacturing methods.

In the past, gray colored heat absorbing glasses often relied on the inclusion of nickel as a chief coloring agent. But avoiding the inclusion of nickel is desirable because the presence of nickel during the melting process sometimes leads to the formation of nickel sulfide stones in the glass. Although the nickel sulfide stones are nearly invisible and cause no harm to the glass under normal conditions, the high coefficient of thermal expansion of nickel sulfide can cause thermally induced stresses sufficient to fracture a glass sheet having a nickel sulfide stone. This is a particular problem in applications like automobile sun roofs where tempering of the product is desired but the presence of nickel sulfide stones can produce an unacceptably high rate of thermal breakage during tempering or thereafter. Some prior art gray glass having nickel as a major colorant also has the disadvantage of undergoing a color shift when thermally tempered.

A typical prior art dark gray glass composition is the following, in which nickel is relied on for the gray color:

| | |
|---|---|
| $SiO_2$ | 72.90% by weight |
| $Na_2O$ | 13.70 |
| $K_2O$ | 0.03 |
| CaO | 8.95 |
| MgO | 3.90 |
| $Al_2O_3$ | 0.10 |
| $SO_3$ | 0.27 |
| $Fe_2O_3$ | 0.060 |
| CoO | 0.015 |
| NiO | 0.095 |

Another nickel-containing gray glass composition is disclosed in U.S. Reissue Pat. No. 25,312 (Duncan et al.). The luminous (visible) transmittances for the examples in that patent are higher than desired for the glass of the present invention.

Attempts have been made to produce nickel-free gray glass as shown in U.S. Pat. No. 3,723,142 (Kato et al.) and British Patent Specification 1,331,492 (Bamford). In both of these patents the glass is more transparent than is considered suitable for the sun roof type of application to which the present invention is directed.

Another attempt at nickel-free gray glass is disclosed in U.S. Pat. No. 4,104,076 (Pons) where, instead of nickel, $Cr_2O_3$ or $UO_2$ are required, both of which have their own drawbacks. Chromium compounds are difficult to melt and present disposal problems, and therefore are preferably avoided. Uranium oxide is costly and has a weak coloration effect, requiring relatively large quantities. Although broad ranges for the coloring agents are disclosed in that patent, all of the examples have colorant concentrations that would not produce the particular combination of properties desired here.

U.S. Pat. No. 3,300,323 (Plumat et al.) also involves an attempt to produce gray glass without nickel. Instead of nickel, this patent's approach requires the inclusion of $TiO_2$ and optionally $MnO_2$, both of which present significant drawbacks. A glass composition having significant amounts of $TiO_2$ is not compatible with the float forming process, by which most flat glass is now produced. This is because the $TiO_2$ causes a yellow color to form when the glass comes into contact with molten tin in the float process. Glass containing $MnO_2$ has a tendency to form brown coloration when exposed to ultraviolet radiation, thus making product uniformity difficult to maintain. Additionally, the plural valance states of manganese makes control of the oxidizing conditions in the glass melting operation very critical, which renders control of the color difficult in a manufacturing operation.

Glasses having a color described as "rose-smoke" are produced by the teachings of U.S. Pat. Nos. 2,524,719 (Tillyer) and 2,892,726 (Smith et al.) using iron, cobalt, and selenium as the coloring agents. Not only are these glasses not a neutral gray, but also the large amounts of iron required to lower the transmittance render the compositions extremely difficult to melt on a large scale, continuous basis would be required for the commercial manufacture of flat glass.

The combination of iron, cobalt, and selenium is disclosed as the coloring agent for making bronze colored glass in U.S. Pat. No. 3,296,004 (Duncan).

It would be desirable to be able to make a dark, neutral gray, nickel-free glass with low transmittance, without troublesome constituents, and that is compatible with commercial flat glass manufacturing techniques.

SUMMARY OF THE INVENTION

The present invention is a glass composition having a neutral dark gray color and low transmittance that is essentially nickel-free. The glass of the present invention has a standard soda-lime-silica flat glass base composition and avoids constituents that cause difficulty in manufacturing such as chromium, manganese, and titanium. It has been found that at low transmittances, a neutral gray glass can be produced using only iron, cobalt, and selenium as the colorants in the following ranges:

| | Weight Percent of Total Glass | |
|---|---|---|
| Component | Range | Preferred Range |
| $Fe_2O_3$ (total iron) | 0.55–1.0 | 0.6–0.8 |
| FeO | 0.09–0.3 | 0.10–0.2 |
| Se | 0.003–0.02 | 0.005–0.01 |
| CoO | 0.005–0.2 | 0.01–0.02 |

At 0.219 inch (5.56 millimeter) the glass of the present invention exhibits luminous transmittance (C.I.E. illuminant C) of 5% to 20% and total solar energy transmittance of less than 40%. Although not primary characteristics of the invention, the preferred embodiments have total solar infrared transmittance of less than 40% and total solar ultraviolet transmittance of less than 20%.

Neutral gray coloration is usually marked by low excitation purity. That is true of the glass of the present invention as well, but because of the exceptionally low luminous transmittance, considerably greater leeway as to excitation purity is advantageously provided by the present invention. With the novel glass composition of the present invention excitation purity may range as high as 10% without significantly affecting the neutrality of the color. As a result, maintaining specifications during manufacturing is made easier. On the other hand, if the excitation purity is kept relatively low (e.g., less than about 6%), the glasses of the present invention permit unusually broad variation of the dominant wavelength without deviating from a neutral gray appearance. Normally, neutral gray coloration would require the dominant wavelength to be restricted to a relatively narrow range such as 485 to 490 nanometers, but the neutral gray glasses of the present invention exhibit dominant wavelengths ranging from 415 to 595 nanometers. This also provides greater flexibility in the manufacturing process.

Inclusion of nickel has heretofore been considered essential for producing a neutral gray colored glass of this type because of its particular absorption spectrum. The absence of nickel and its absorption characteristics are accommodated in the present invention without addition of extraneous colorants by the combination of relatively high selenium concentrations and low transmittance produced by relatively high iron concentrations. Cobalt concentrations are also relatively high to balance the coloring effects of high selenium concentration. Although the selenium cannot duplicate the absorption spectrum of nickel, it has been discovered that in a glass with low transmittance the absorption pattern of high selenium concentration produces a neutral gray color that is virtually indiscernible by the human eye from nickel-containing gray glass. It is also theorized that the effect is enhanced by the presence of substantial amounts of iron in the ferrous state which is believed to yield formation of ferrous selenite coloration sites in the glass.

DETAILED DESCRIPTION

Soda-lime-silica flat glass may be essentially characterized by the following composition on a weight percentage basis of the total glass:

| | |
|---|---|
| $SiO_2$ | 68–75% |
| $Na_2O$ | 10–18 |
| CaO | 5–15 |
| MgO | 0–5 |
| $Al_2O_3$ | 0–5 |
| $K_2O$ | 0–5 |
| BaO | 0–1 |
| $B_2O_3$ | 0–7 |

Other minor ingredients, including melting and refining aids such as $SO_3$, may also appear in the glass composition. To this base are added the coloring constituents of the present invention set forth above. The glass is essentially free of nickel; that is, no deliberate addition of nickel or nickel compounds is made, although the possibility of traces of nickel due to contamination may not always be avoided. Likewise, the glass is essentially free of colorants other than iron, cobalt, and selenium, and specifically it is essentially free of chromium, titanium, and manganese other than any trace amounts that may be present as impurities. Accordingly, the glass of the present invention may be melted and refined in a conventional tank-type melting furnace and formed into flat glass sheets of varying thicknesses by the float method in which the molten glass is supported on a pool of molten metal, usually tin, as it assumes a ribbon shape and is cooled.

The concentrations of each of the three colorant constituents depend upon the transmittance desired for the glass and are interrelated to each other. The selenium contributes a pink color to the glass, cobalt produces a blue color, and iron contributes green and blue in varying proportions depending upon the oxidation state. Iron in the ferric state ($Fe_2O_3$) yields a yellow color, and iron in the ferrous state (FeO) produces a blue color. In the present invention, 15 to 50 percent of the total iron (expressed as $Fe_2O_3$) may be in the ferrous state. When the total amount of iron is in the upper portion of its concentration range and the proportion of iron in the ferrous state is relatively high, the CoO concentration may be maintained at the low end of its range of 0.005 to 0.03 percent. However, reducing conditions during melting tend to accelerate volatilization of the selenium from the melt. Therefore, to conserve selenium it is preferred to employ moderate reducing conditions so that no more than about 30 percent of the total iron is in the ferrous state. Selenium concentration should vary proportionally to the total of CoO and FeO concentrations in order to maintain a neutral color.

The upper limit of 20 percent luminous transmittance corresponds approximately to the minimum concentrations for each colorant and 15 percent of the iron in the ferrous state. Luminous transmittance of 5 percent can be achieved with the CoO at the minimum concentration, the iron at the maximum state of reduction (50%), and selenium increased to 0.012 percent. The same 5 percent transmittance may be achieved at lower reduction levels by increasing the CoO concentration. The oxidation-reduction state of the glass is controlled in a manner known to those of skill in the art by including reducing agents (such as coal or other source of carbon) in the batch mixture or by controlling the air/fuel firing ratio in the melting furnace. It should be readily apparent that the luminous transmittance can be varied within the 5 to 20 percent range by adjusting the colorant composition and the oxidation/reduction level in accordance with the principles set forth above.

The following examples are embodiments of the present invention. All are neutral gray in appearance and provide satisfactory control of glare and solar heat gain. Those with luminous transmittance less than 15 percent are particularly desirable for sun roof applications. The examples with higher luminous transmittances may also be acceptable for some applications and may be provided with a reflective coating to improve their solar control properties. Examples 1 and 12 may be preferred for their low luminous transmittances. Example 5 also has a low luminous transmittance, but has a marginally high dominant wavelength. Example 13 has desirably low transmittance, but is not a preferred embodiment because it entails a relatively oxidized glass (as evidenced by the low FeO concentration) in order to retain an amount of selenium near the upper end of the preferred range. Such an oxidized glass may be difficult to produce in a commercial melting furnace.

|  | Examples | | | | | | | |
|---|---|---|---|---|---|---|---|---|
|  | 1 | 2 | 3 | 4 | 5 | 6 | 7 | 8 |
| Weight % Colorants | | | | | | | | |
| $Fe_2O_3$ (total) | 0.685 | 0.688 | 0.678 | 0.666 | 0.648 | 0.606 | 0.667 | 0.577 |
| FeO | 0.108 | 0.126 | 0.107 | 0.108 | N.A. | N.A. | N.A. | N.A. |
| Se | 0.0093 | 0.0055 | 0.0067 | 0.0072 | 0.0061 | 0.0100 | 0.0033 | 0.0036 |
| CoO | 0.017 | 0.017 | 0.017 | 0.016 | 0.017 | 0.015 | 0.014 | 0.014 |
| Transmittance (%) (at 5.56 mm thickness) | | | | | | | | |
| Luminous (C) | 14.3 | 15.9 | 16.2 | 16.1 | 14.1 | 18.6 | 19.1 | 18.4 |
| Ultraviolet | 4.7 | 4.4 | 6.7 | 6.4 | 4.8 | 5.3 | 13.4 | 12.6 |
| Infrared | 37.7 | 38.5 | 36.0 | 37.8 | 35.3 | 40.3 | 23.8 | 27.4 |
| Total Solar Energy Transmittance | 27.7 | 28.6 | 28.1 | 28.7 | 26.5 | 30.8 | 23.3 | 24.9 |
| Dominant Wavelength (nm) | 502.95 | 496.51 | 447.13 | 556.01 | 560.23 | 495.31 | 448.13 | 415.54 |
| Excitation Purity (%) | 3.04 | 1.50 | 4.85 | 4.25 | 3.15 | 1.62 | 4.60 | 5.01 |

|  | 9 | 10 | 11 | 12 | 13 |
|---|---|---|---|---|---|
| Weight % Colorants | | | | | |
| $Fe_2O_3$ (total) | 0.681 | 0.611 | 0.660 | 0.682 | 0.566 |
| FeO | N.A. | 0.119 | 0.146 | 0.157 | 0.099 |
| Se | 0.0063 | 0.0065 | 0.0045 | 0.0064 | 0.0089 |
| CoO | 0.014 | 0.014 | 0.013 | 0.018 | 0.017 |
| Transmittance (%) | | | | | |
| Luminous (C) | 19.0 | 16.9 | 17.2 | 12.0 | 14.0 |
| Ultraviolet | 7.3 | 7.0 | 10.0 | 6.2 | 5.1 |
| Infrared | 35.6 | 31.2 | 25.0 | 25.7 | 32.6 |
| Total Solar Energy Transmittance | 29.0 | 25.7 | 22.7 | 20.8 | 25.1 |
| Dominant Wavelength (nm) | 495.23 | 594.52 | 502.92 | 531.73 | 494.7 |
| Excitation Purity (%) | 1.92 | 4.39 | 2.35 | 4.36 | 2.59 |

The base glass composition for Example 12, which is essentially the same for all of the examples, is as follows:

| Component | Weight Percent of Total Glass |
|---|---|
| $SiO_2$ | 74.23 |
| $Na_2O$ | 12.94 |
| CaO | 8.12 |
| MgO | 3.60 |
| $SO_3$ | 0.14 |
| $Al_2O_3$ | 0.12 |
| $K_2O$ | 0.03 |

The batch mixture for Example 12, which is likewise similar for all of the examples except for the colorants, was:

| Constituent | Parts by Weight |
|---|---|
| Sand | 1000 |
| Soda Ash | 330 |
| Sodium Sulfate | 10 |
| Limestone | 84 |
| Dolomite | 242 |
| Rouge | 10 |
| $CO_3O_3$ | 0.368 |
| Selenium | 11 |
| Sodium Nitrate | 20 |

It is an advantage of the present invention that the composition can be manufactured into flat glass products using commercial manufacturing processes, in particular the float process. A sheet of glass that has been formed by the float process is characterized by measurable amounts of tin oxide that migrated into surface portions of the glass on at least one side. Typically a piece of float-forming glass has an $SnO_2$ concentration of at least 0.05% by weight in the first few microns below the surface that was in contact with the tin.

Glass made by the float process typically ranges from about 2 millimeters to 10 millimeters in thickness. For sun roof applications of the invention, it is preferred that the transmittance properties be attained within the thickness range of 3 to 6 millimeters.

Another characteristic of most mass-produced glass is the presence of traces of melting and refining aids such as sulfur, analyzed in the glass as $SO_3$, or fluorine or chlorine. Small amounts of these melting and refining aids (usually less than 0.3% by weight) may be present in the glass compositions of the present invention without effect on the properties.

Other variations as are known to those of skill in the art may be resorted to without departing from the scope of the invention as defined by the claims that follow.

I claim:

1. A neutral gray colored glass composition having a base glass composition comprising:

| $SiO_2$ | 68–75 percent by weight |
|---|---|
| $Na_2O$ | 10–18 |
| CaO | 5–15 |
| MgO | 0–5 |
| $Al_2O_3$ | 0–5 |
| $K_2O$ | 0–5 | and traces of melting and refining aids, if any, and colorants consisting essentially of:

| $Fe_2O_3$ (total iron) | 0.6–1.0 percent by weight |
|---|---|

| | |
|---|---|
| Se | 0.005–0.02 |
| CoO | 0.01–0.02 | at least 15 percent of the iron being in the ferrous state, the glass having a luminous transmittance of no more than 20 percent and total solar energy transmittance less than 40 percent at a thickness of 0.219 inch (5.56 millimeters).

2. The composition of claim 1 wherein the portion of the iron in the ferrous state constitutes 0.09 to 0.3 percent by weight of the total glass composition, expressed as FeO.

3. The composition of claim 1 wherein the colorant portion consists essentially of:

| | |
|---|---|
| $Fe_2O_3$ (total iron) | 0.6–0.8 percent by weight |
| Se | 0.005–0.01 |
| CoO | 0.01–0.02 |

4. The composition of claim 3 wherein the portion of the iron in the ferrous state constitutes 0.10 to 0.2 percent by weight of the total glass composition, expressed as FeO.

5. A low transmittance, neutral gray sun roof comprising a glass sheet having a base glass composition comprising:

| | | |
|---|---|---|
| $SiO_2$ | 68–75 | percent by weight |
| $Na_2O$ | 10–18 | |
| CaO | 5–15 | |
| MgO | 0–5 | |
| $Al_2O_3$ | 0–5 | |
| $K_2O$ | 0–5 | | and traces of melting and refining aids, if any, and colorants consisting essentially of:

| | |
|---|---|
| $Fe_2O_3$ (total iron) | 0.6–1.0 percent by weight |
| Se | 0.005–0.02 |
| CoO | 0.01–0.02 | at least 15 percent of the iron being in the ferrous state, the glass having a luminous transmittance of no more than 20 percent and total solar energy transmittance less than 40 percent at a thickness of 0.219 inch (5.56 millimeters).

6. The article of claim 5 wherein the sheet has a thickness of 2 to 10 millimeters.

7. The article of claim 5 wherein the sheet has a thickness of 3 to 6 millimeters.

8. The article of claim 5 wherein a surface portion of the sheet includes at least 0.05 percent by weight $SnO_2$.

9. The article of claim 5 wherein the portion of the iron in the ferrous state constitutes 0.09 to 0.3 percent by weight of the glass, expressed as FeO.

10. The article of claim 5 wherein the colorant portion of the glass sheet consists essentially of:

| | |
|---|---|
| $Fe_2O_3$ (total iron) | 0.6–0.8 percent by weight |
| Se | 0.005–0.01 |
| CoO | 0.01–0.02 |

11. The article of claim 10 wherein the portion of the iron in the ferrous state constitutes 0.10 to 0.2 percent by weight of the glass, expressed as FeO.

12. The article of claim 5 wherein the luminous transmittance is less than 15 percent at a thickness of 0.219 inch (5.56 millimeters.)

* * * * *